United States Patent [19]

Otsu

[11] Patent Number: 5,427,441
[45] Date of Patent: Jun. 27, 1995

[54] BRAKE CONTROL SYSTEM WITH WHEEL ANTILOCK FUNCTION

[75] Inventor: Nobuyuki Otsu, Atsugi, Japan

[73] Assignee: Unisia Jecs Corporation, Kanagawa, Japan

[21] Appl. No.: 116,769

[22] Filed: Sep. 7, 1993

[30] Foreign Application Priority Data

Sep. 7, 1992 [JP] Japan ............................ 4-062628 U
Sep. 21, 1992 [JP] Japan ................................ 4-251305

[51] Int. Cl.⁶ .............................................. B60T 8/72
[52] U.S. Cl. ............................. 303/100; 303/DIG. 4; 303/109
[58] Field of Search ................. 303/107, 109, 100, 97, 303/99; 364/426.02

[56] References Cited

U.S. PATENT DOCUMENTS

| 3,904,251 | 9/1975 | Hikada et al. ...................... 303/109 |
| 4,779,696 | 10/1988 | Harada et al. ...................... 303/103 |
| 5,210,690 | 5/1993 | Kageyama et al. ................... 303/95 |

FOREIGN PATENT DOCUMENTS 60-261767 12/1985 Japan .
63-232059 9/1988 Japan .

*Primary Examiner*—Matthew C. Graham
*Attorney, Agent, or Firm*—Lowe, Price, LeBlanc & Becker

[57] ABSTRACT

In an antilock brake control system, a predetermined ratio of a pressure reduction threshold value to a pseudo vehicular body speed is varied in accordance with predetermined sections of a range of the pseudo vehicular body speed.

10 Claims, 9 Drawing Sheets

BRAKE CONTROL SYSTEM WITH WHEEL ANTILOCK FUNCTION

BACKGROUND OF THE INVENTION

The present invention relates generally to an antilock brake control system for vehicles and more particularly, to the antilock brake control system which is responsive to braking upon cruising at high speed or on snow.

Conventionally, with the antilock brake control system which prevents lock of wheels upon sudden braking of a vehicle such as motor vehicle, a pseudo vehicular body speed is determined in accordance with a detected wheel speed so as to establish a target wheel speed which is in a predetermined ratio with respect to the pseudo vehicular body speed. When the detected wheel speed is smaller than the target wheel speed, pressure decreasing control is carried out which starts a reduction in brake fluid pressure within wheel cylinders. See, for example, JP-A 60-261767.

With such known antilock brake control system, however, since the ratio of the target wheel speed to the pseudo vehicular body speed which is relevant to start of pressure decreasing control is established to be constant regardless of the magnitude of a vehicular speed, i.e., a skid ratio is established to be always constant, there arises a problem that in braking operation throughout the entire area of a cruising speed of the vehicle, stable behavior of the vehicle may not be always obtained. By way of example, if the skid ratio is established at a constant value so as to conform to braking of the vehicle upon relatively low speed, a skid amount of wheels is increased in braking of the vehicle upon high speed, deteriorating stability of the vehicle.

Figure 11:
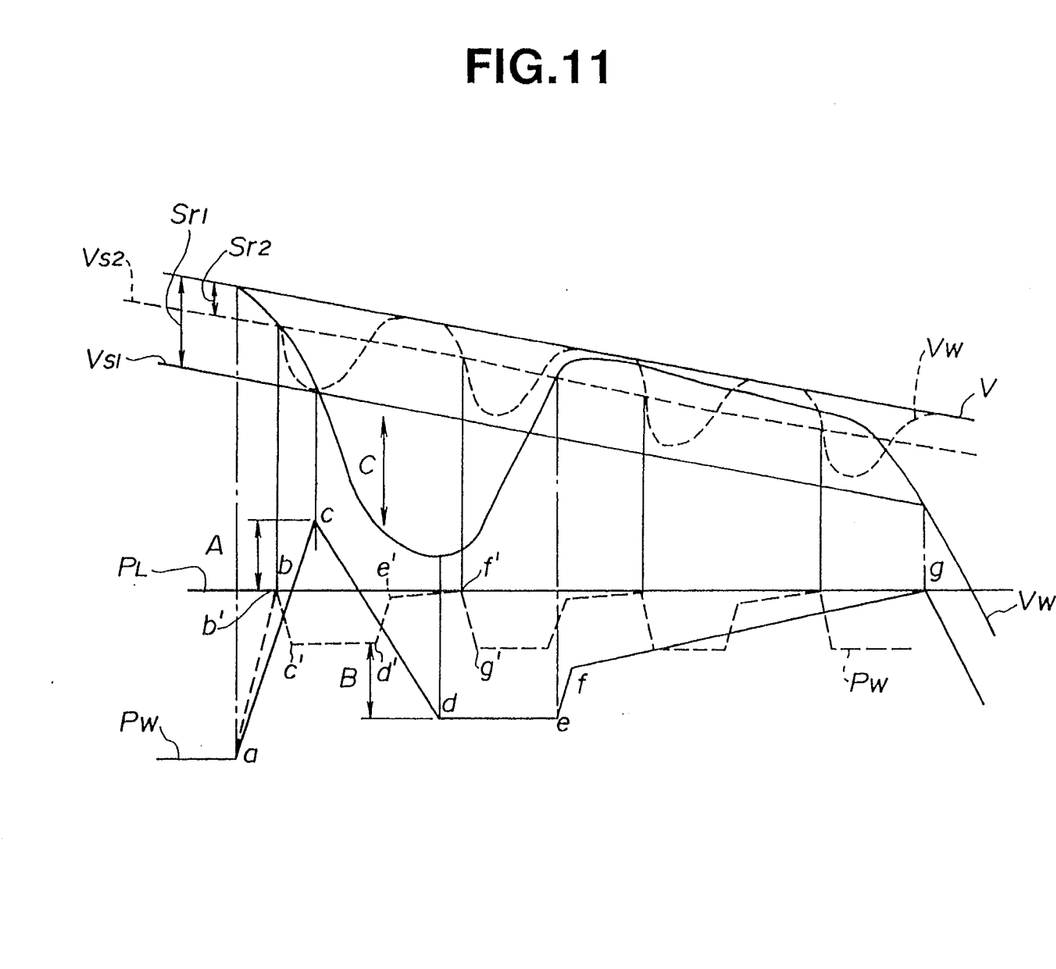
FIG. 11 is a view similar to FIG. 10, showing a control characteristic of a vehicle.

The cause thereof is as follows: Since a friction coefficient $\mu$ between the wheels and the road (designated "road $\mu$") is decreased with an increase in vehicular speed, a brake fluid pressure corresponding to a peak value of the road $\mu$ (designated "lock fluid pressure" since the wheels tend toward lock when exceeding this) is also decreased. With the lock fluid pressure decreased, an overshoot part of the brake fluid pressure to the lock fluid pressure is increased, enlarging the skid amount of the wheels. Referring to FIG. 11, $P_W$ designates a brake fluid pressure applied to the wheel cylinders, which is increased at a point "a" where braking starts. V designates a pseudo vehicular body speed, $V_W$ designates a wheel speed, $V_{S1}$ designates a target wheel speed, and $S_{r1}$ designates a target skid ratio of the wheel speed to the pseudo vehicular body speed. It is to be noted that fully-drawn lines indicate a case that the target skid ratio $S_{r1}$ is established at a constant value upon high speed as well as upon low speed.

Thus, the wheel speed $V_W$ is decreased with an increase in brake fluid pressure $P_W$. However, since the target wheel speed $V_{S1}$ at which a pressure reduction starts is established in a constant ratio with respect to the pseudo vehicular body speed V, the target wheel speed $V_{S1}$ is large upon high speed. Therefore, a pressure increase can be continued even if the brake fluid pressure $P_W$ exceeds a lock fluid pressure $P_L$, producing an overshoot part A of the brake fluid pressure between points "b" and "c". At the point "c" at which the wheel speed $V_W$ reaches the target wheel speed $V_{S1}$, pressure decreasing control starts which induces the greater skid amount C of the wheels due to the overshoot part A.

On the other hand, recovery of the wheel speed $V_W$ is expected according to pressure decreasing control, which is delayed, however, due to the greater skid amount C of the wheels and inertia thereof, producing an excessive reduction B in the brake fluid pressure $P_W$. This excessive pressure reduction may cause a long-sustained short braking force state (a point "d" to a point "e").

It is, therefore, an object of the present invention to provide an antilock brake control system which ensures stable behavior of a vehicle with regard to braking throughout the entire area of a cruising speed of the vehicle.

SUMMARY OF THE INVENTION

According to one aspect of the present invention, there is provided a method of controlling a brake of a vehicle in a antilock manner, the vehicle having a plurality of wheels and a plurality of wheel cylinders arranged thereto, the method comprising the steps of:

sensing speeds of the plurality of wheels, respectively;

calculating a pseudo vehicular body speed in response to said speeds of the plurality of wheels;

determining a pressure reduction threshold value for starting a reduction of a brake fluid pressure within said plurality of wheel cylinders, said pressure reduction threshold value corresponding to said pseudo vehicular body speed at a predetermined ratio; and varying said predetermined ratio of said pressure reduction threshold value to said pseudo vehicular body speed in accordance with predetermined sections of a range of said pseudo vehicular body speed.

According to another aspect of the present invention, there is provided a system for controlling a brake of a vehicle in a antilock manner, the vehicle having a plurality of wheels and a plurality of wheel cylinders arranged thereto, the system comprising:

a plurality of speed sensors arranged to sense speeds of the plurality of wheels, respectively; and a microcomputer based control unit connected to said plurality of speed sensors, said microcomputer based control unit including:

means for calculating a pseudo vehicular-body speed in response to said speeds of the plurality of wheels;

means for determining a pressure reduction threshold value for starting a reduction of a brake fluid pressure within said plurality of wheel cylinders, said pressure reduction threshold value corresponding to said pseudo vehicular body speed at a predetermined ratio; and means for varying said predetermined ratio of said pressure reduction threshold value to said pseudo vehicular body speed in accordance with predetermined sections of a range of said pseudo vehicular body speed.

DETAILED DESCRIPTION OF THE INVENTION

Referring to FIGS. 1 to 8, there is shown a first preferred embodiment of the present invention.

Figure 1:
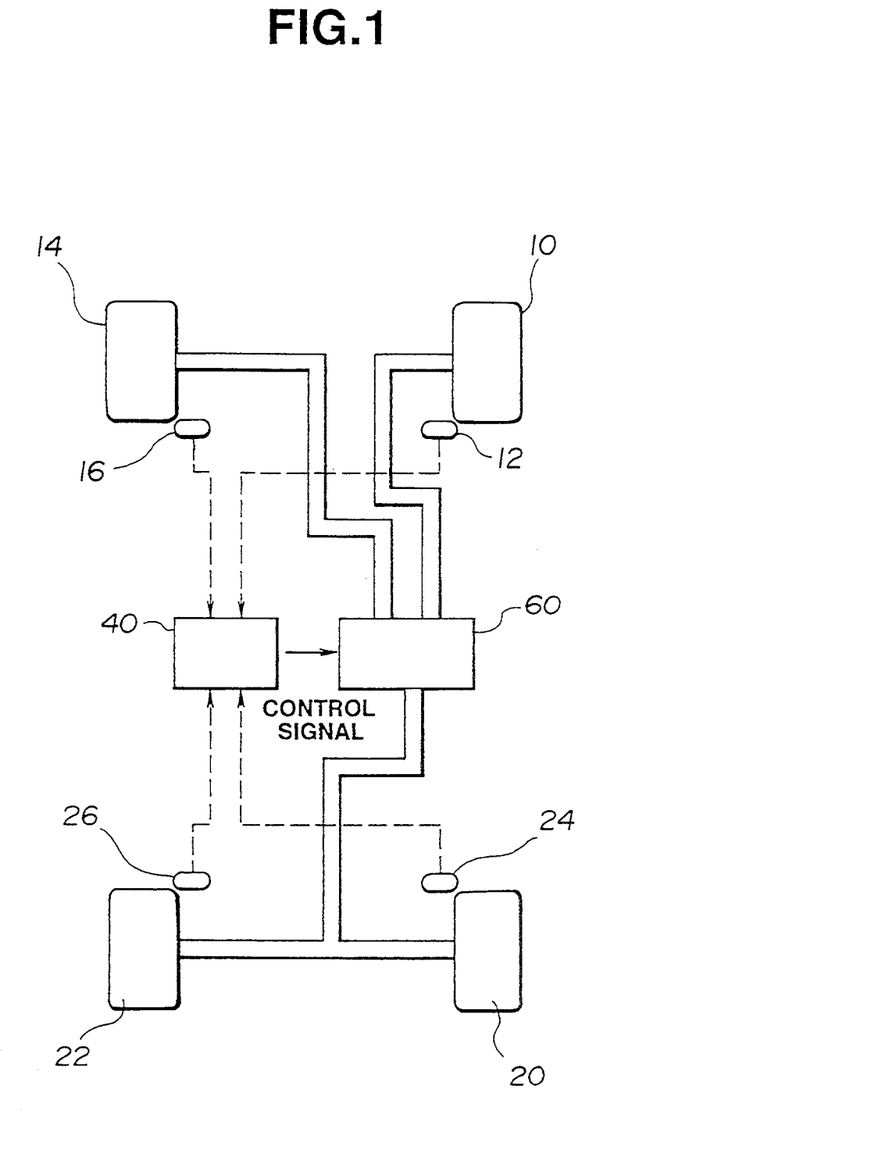
FIG. 1 is a block diagram showing an antilock brake control system according to the present invention.
Figure 2:
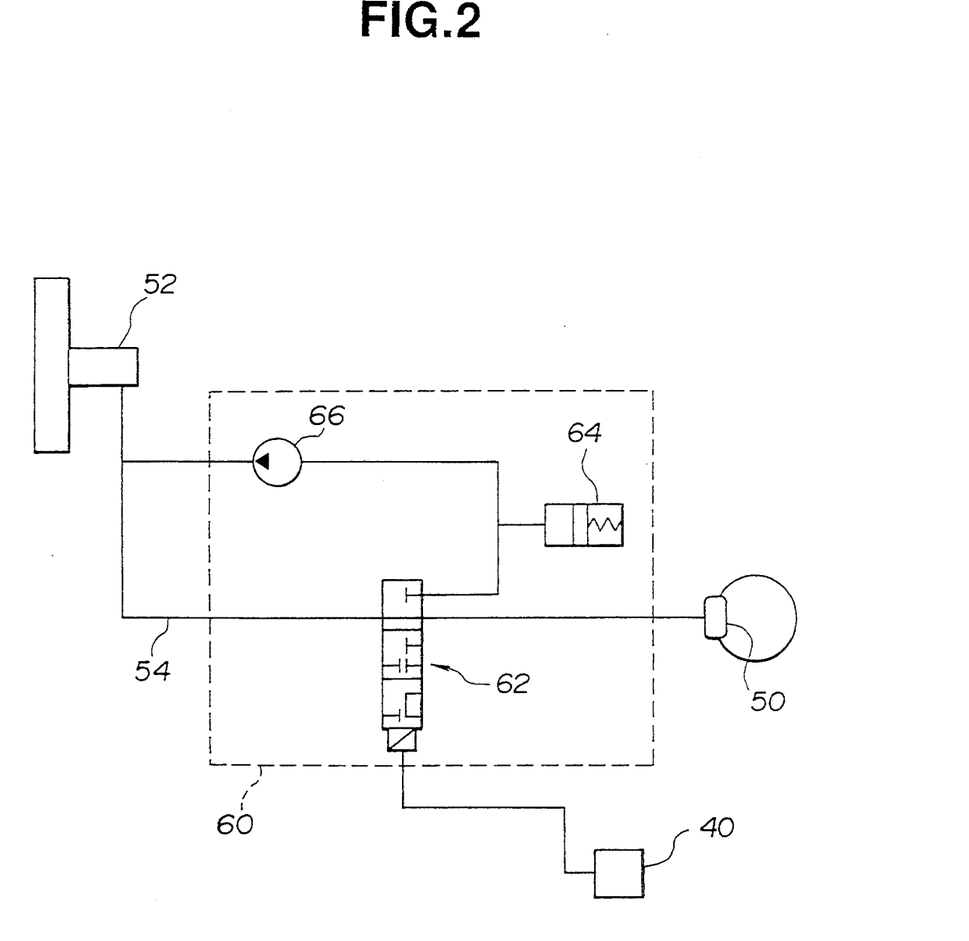
FIG. 2 is a view similar to FIG. 1, showing a brake fluid pressure circuit of the antilock brake control system.

Referring first to FIG. 1, wheel speed sensors 12, 16 are arranged to right and left front wheels 10, 14 as dirigible wheels, respectively, for generating wheel speed pulses in accordance with rotation of the right and left front wheels 10, 14, whereas wheel speed sensors 24, 26 are arranged to right and left rear wheels 20, 22 as driving wheels, respectively, for generating wheel speed pulses in accordance with rotation of the right and left rear wheels 20, 22. These sensors are connected to a control unit 40 (hereinafter refer to as "ECU") comprising a microcomputer. Referring to FIG. 2, a wheel cylinder 50 arranged to each wheel communicates through a main fluid passage 54 with a master cylinder 52 for producing a brake fluid pressure when a driver depresses a brake pedal. An actuator unit 60 is disposed in the middle of the main fluid passage 54 for controlling fluid pressure within the wheel cylinder 50.

The actuator unit 60 includes a change-over control valve 62 for changing/controlling an increase and decrease in fluid pressure within the wheel cylinder 50, a reservoir 64 for storing brake fluid upon pressure reduction within the wheel cylinder 50, and a pump 66 for returning brake fluid stored in the reservoir 64 to the main fluid passage 54.

Figure 3:
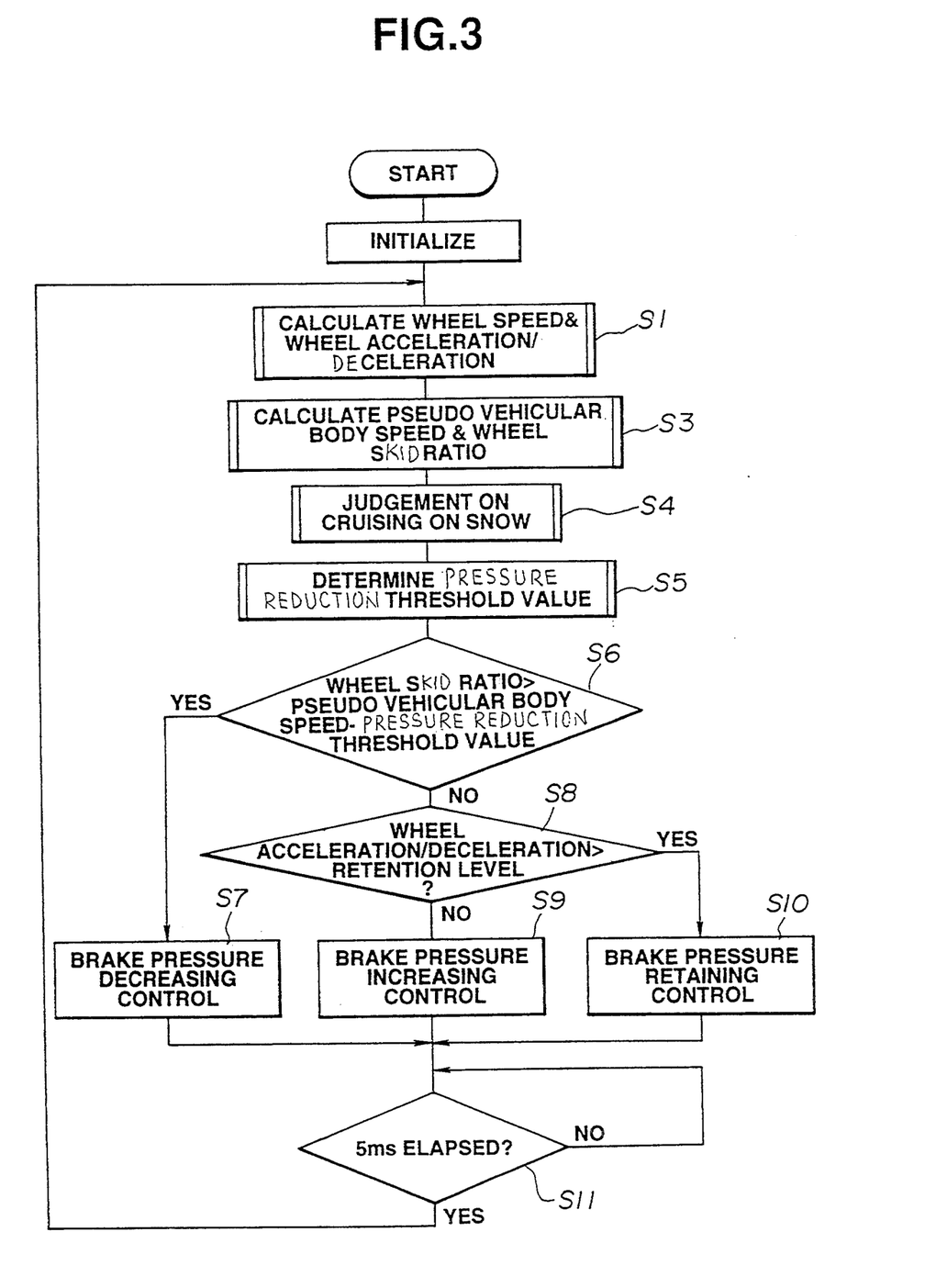
FIG. 3 is a flowchart showing a first preferred embodiment of the present invention.
Figure 4:
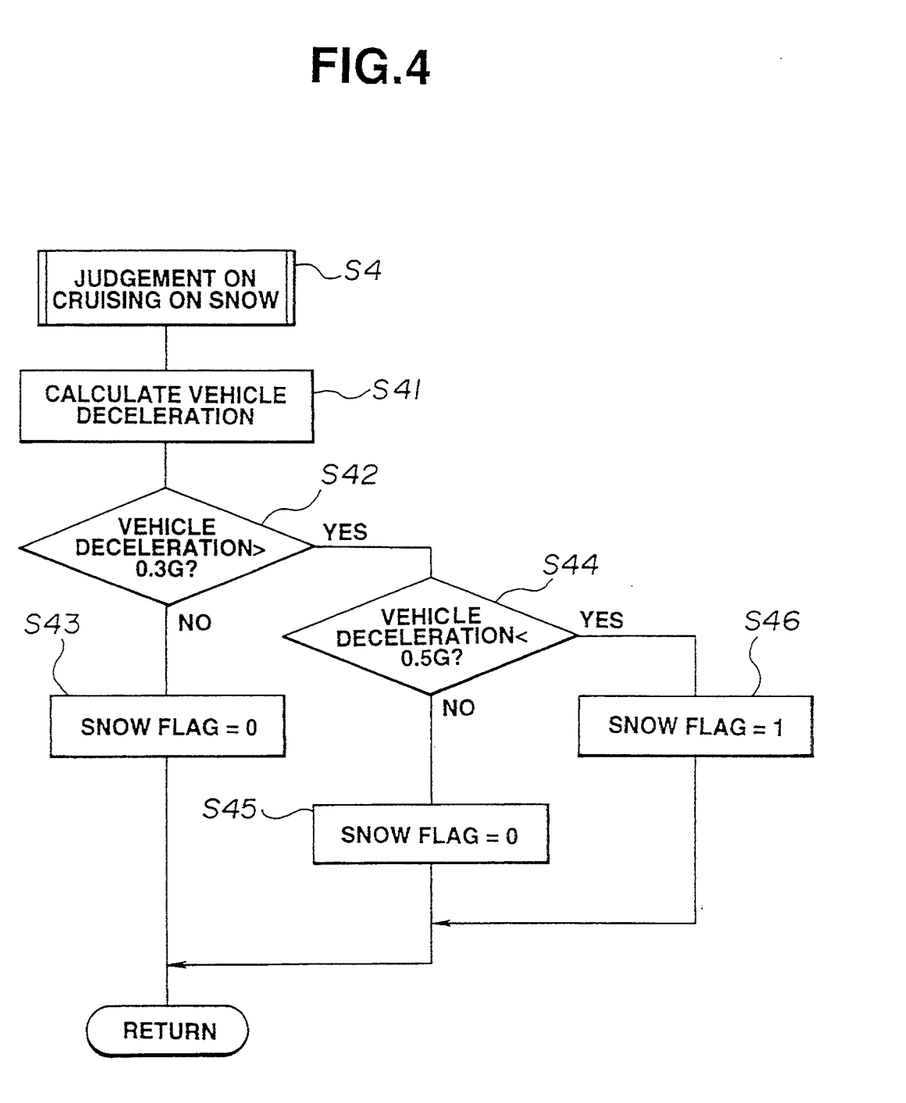
FIG. 4 is a view similar to FIG. 3, showing one subroutine of FIG. 3.
Figure 5:
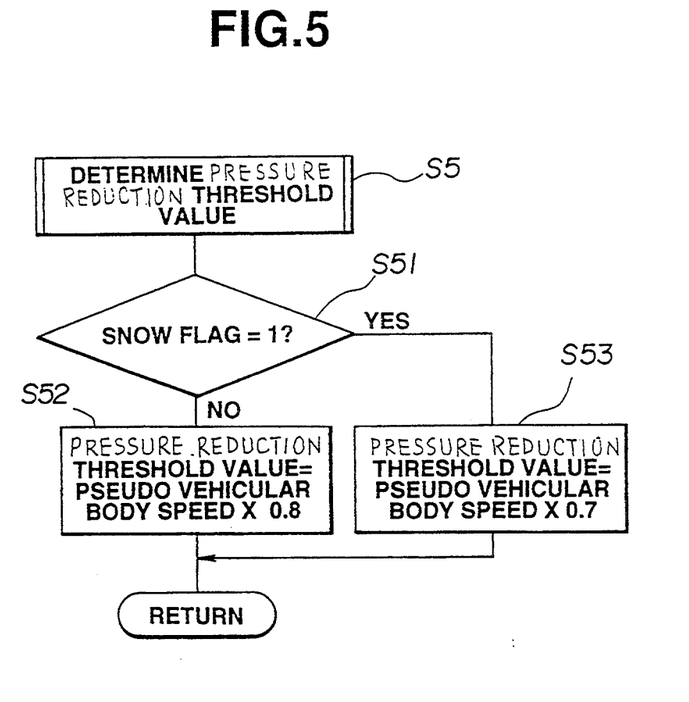
FIG. 5 is a view similar to FIG. 3, showing another subroutine of FIG. 3.

Referring next to FIGS. 3 to 5, operation of this embodiment will be described.

In the ECU 40, as shown in a flowchart in FIG. 3, after initialization, at a step S1, wheel speeds of the right and left front wheels 10, 14, and right and left rear wheels 20, 22 are calculated in accordance with outputs of the wheel speed sensors 12, 16, 24, 26, respectively, for obtaining a respective wheel acceleration/deceleration. At a subsequent step S2, a maximum one of the wheel speeds calculated at the step S1 is selected, on which a pseudo vehicular body speed is calculated. A skid ratio of each wheel is calculated on this pseudo vehicular body speed and the above each wheel speed.

Subsequently, at a step S4, it is judged whether or not the vehicle cruises on snow.

Judgement of cruising on snow is carried out according to a flowchart as shown in FIG. 4. At a step S41, a vehicle deceleration is calculated on the pseudo vehicular body speed. At subsequent steps S42 and S44, it is judged whether or not the vehicle deceleration G (=9.8 m/sec$^2$) thus obtained is in a predetermined range. Specifically, at the step S42, it is judged whether or not the vehicle deceleration is greater than 0.3 G. If the vehicle deceleration is smaller than 0.3 G, control proceeds to a step S43 wherein a snow flag is set to 0, whereas if it is greater than 0.3 G, control proceeds to the step S44 it is judged whether or not the vehicle deceleration is smaller than 0.5 G. At the step S44, if the vehicle deceleration is greater than 0.5 G, control proceeds to a step S45 wherein the snow flag is set to 0, whereas if it is smaller than 0.5 G, i.e., the vehicle deceleration is between 0.3 G and 0.5 G, control proceeds to a step S46 wherein the snow flag is set to 1.

Figure 6:
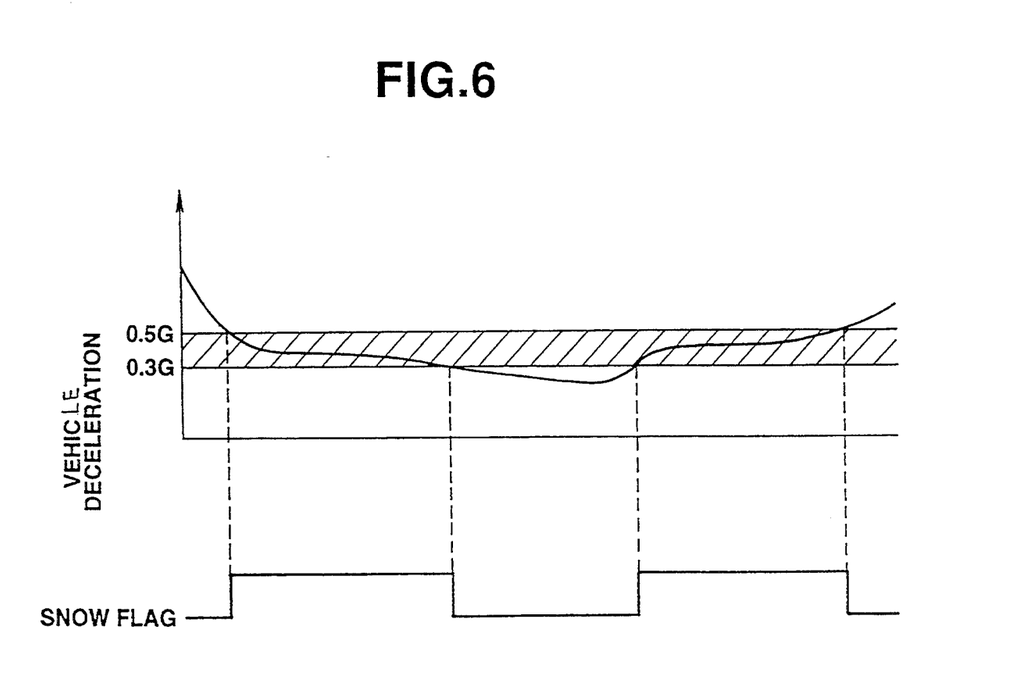
FIG. 6 is a graph showing a relationship between a vehicle deceleration and judgement of cruising on snow.

The above judgement is diagrammatically shown in FIG. 6. Note that it is known upon braking on snow, the vehicle deceleration is approximately between 0.3 G and 0.5 G.

After judgement of cruising on snow at the step S4, control proceeds to a step S5 wherein a pressure reduction threshold value is determined. Referring to FIG. 5, for the pressure reduction threshold value, at a step S51, it is judged whether or not the snow flag is 1 on an judgement result obtained at the step S4.

If the snow flag fails to be 1, control proceeds to a step S52 wherein the pressure reduction threshold value for starting a reduction in brake pressure within the wheel cylinders is established at, for example, 80% of the pseudo vehicular body speed, or 20% of the skid ratio of the wheels.

On the other hand, if the snow flag is 1, control proceeds from the step S51 to a step S53 wherein the pressure reduction threshold value is established at, for example, 70% of the pseudo vehicular body speed, or 30% of the skid ratio of the wheels.

Figure 7:
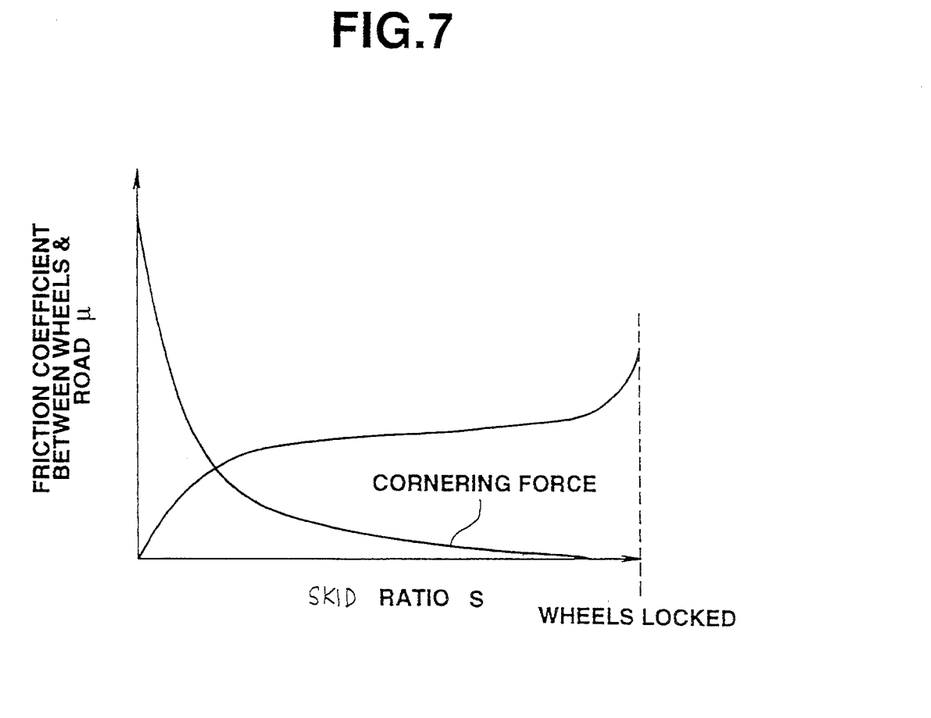
FIG. 7 is a view similar to FIG. 6, showing a relationship between a wheel-road friction coefficient and a skid ratio.

The relationship between a friction coefficient $\mu$ between the wheels and road and the skid ratio S of the wheels varies with a state of a road surface. By way of example, on snow, the relationship between the wheel-road friction coefficient $\mu$ and the wheel skid ratio S is such as shown in FIG. 7. That is, with an increase in the wheel skid ratio S, the wheel-road friction coefficient $\mu$ rises gently, then increases step by step, and finally augments gently again.

Therefore, if the pressure reduction threshold value is decreased whereas the skid ratio is increased as described above, greater braking force can be obtained.

Returning to the flowchart as shown in FIG. 3, at a step S6, the wheel skid ratio obtained at the step S3 is compared with the pressure reduction threshold value (100%—skid ratio) determined at the step S5. If the wheel skid ratio is greater than a value "pseudo vehicular body speed—pressure reduction threshold value", control proceeds to a step S7 wherein brake fluid pressure decreasing control is carried out. That is, the ECU 40 provides a change-over signal to the change-over control valve 62 of the actuator unit 60 so as to cut off communication of the master cylinder 52 with the wheel cylinder 50, and establish communication of the wheel cylinder 50 with the reservoir 64.

On the other hand, at the step S6, if the wheel skid ratio is smaller than the value "pseudo vehicular body speed—pressure reduction threshold value", control proceeds to a step S8 wherein it is judged whether or not the wheel acceleration/deceleration is greater than a predetermined retention level. If the wheel acceleration/deceleration is greater than the predetermined retention level, it means that fluid pressure within the wheel cylinder 50 is rather short, so that control proceeds to a step S9 wherein brake fluid pressure increasing control is carried out. In this case, the change-over control valve 62 of the actuator unit 60 is driven to establish communication of the master cylinder 52 with the wheel cylinder 50.

On the other hand, at the step S8, if the wheel acceleration/deceleration is smaller than the predetermined retention level, control proceeds to a step S10 wherein brake fluid pressure retaining control is carried out. In this case, the change-over control valve 62 is driven to cut off communication of the wheel cylinder 50 with the master cylinder 52 and the reservoir 64.

Thus, after any of controls at the steps S7, S9, and S10, control proceeds to a step S11 wherein time adjustment of 5 ms is carried out, and it returns to the step S1. In other words, the above control routine is carried out every 5 ms.

Figure 8:
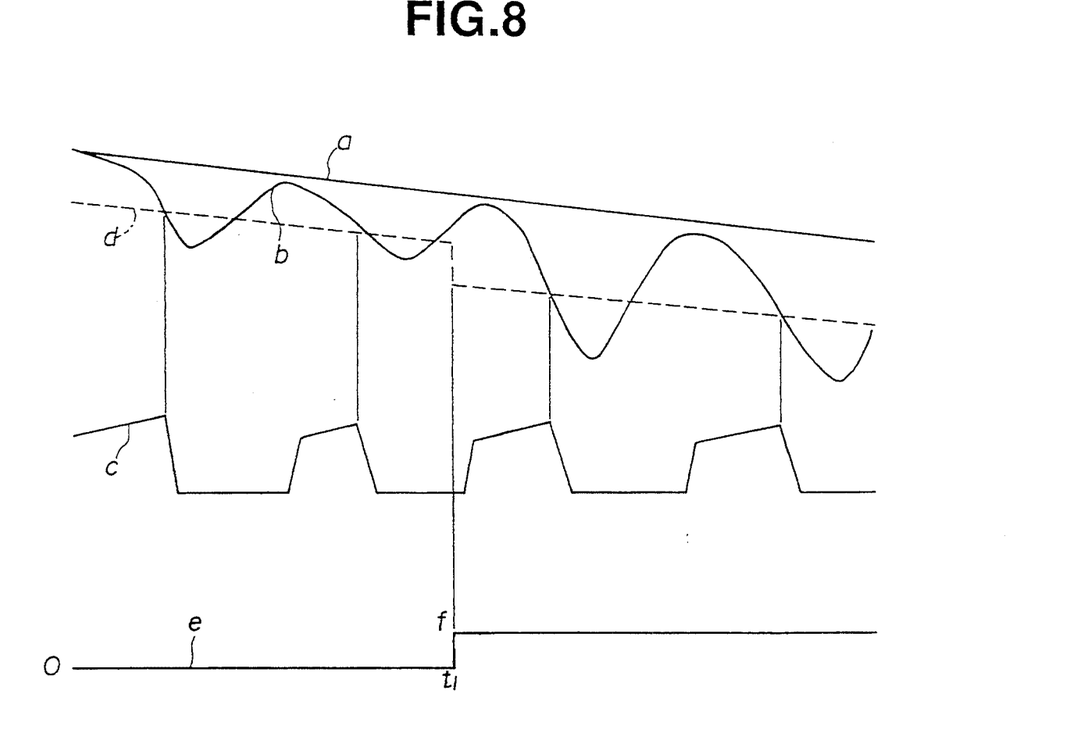
FIG. 8 is a view similar to FIG. 7, showing a time chart of each variable.

Referring to FIG. 8, a further description will be made with regard to a situation of the above control upon braking upon cruising on snow. In FIG. 8, a fully-drawn line "a" indicates pseudo vehicular body speed, a fully-drawn line "b" indicates wheel speed, a fully-drawn line "c" indicates brake fluid pressure within the wheel cylinder 50, a broken line "d" indicates pressure reduction threshold value, and a fully-drawn line "e" indicates snow flag.

A portion before a time $t_1$ in FIG. 8 shows a cruising state of the vehicle on the ordinary road wherein since the snow flag is 0, and the pressure reduction threshold value is 80% as described above, fluid pressure within the wheel cylinder 50 is controlled so that the wheel speed is smaller than the pseudo vehicular body speed by 20%. On the other hand, a portion after the time $t_1$ in FIG. 8 shows a cruising state of the vehicle on snow wherein the snow flag is 1 due to judgement of cruising on snow, and the pressure reduction threshold value is established to be smaller or 70%. As a result, control is carried out so that the wheel skid ratio becomes greater, enabling a reduction in braking distance.

Figure 9:
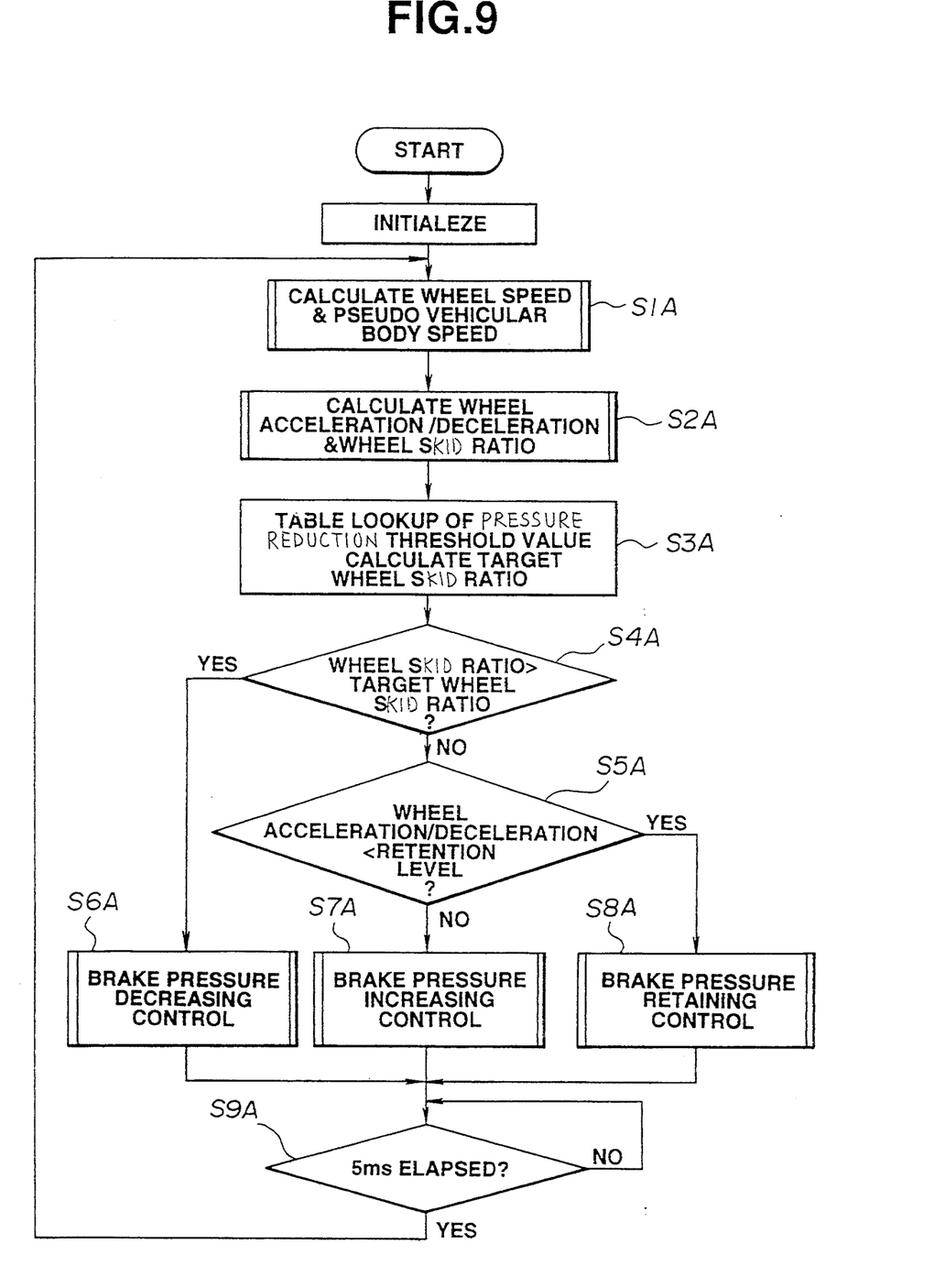
FIG. 9 is a view similar to FIG. 5, showing a second preferred embodiment of the present invention.
Figure 10:
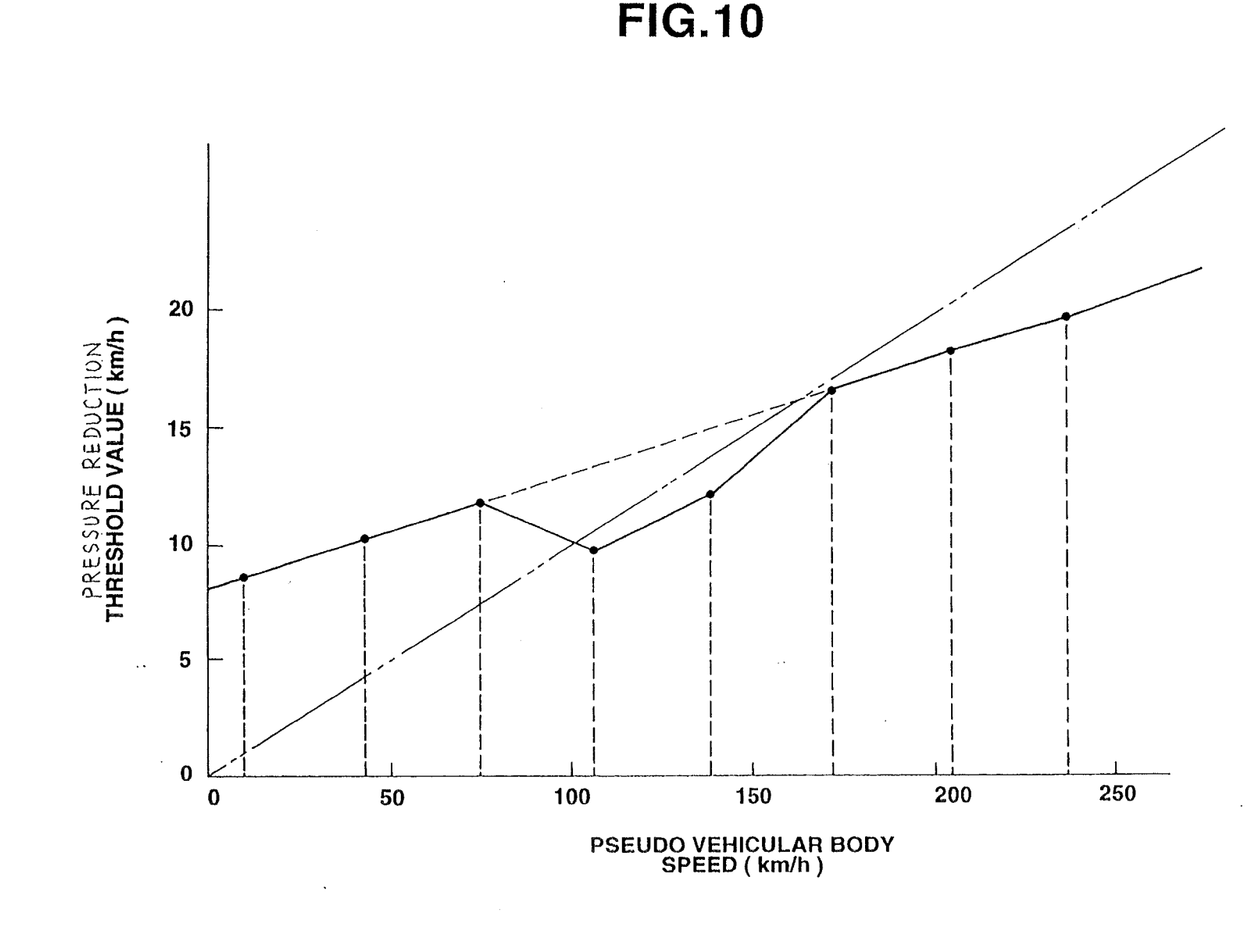
FIG. 10 is a view similar to FIG. 8, showing a relationship between a pseudo vehicular body speed and a pressure reduction threshold value.

Referring to FIGS. 9 to 11, there is shown a second preferred embodiment of the present invention which is substantially the same as the first preferred embodiment.

Operation of this embodiment is as follows:

In the ECU 40, as shown in a flowchart in FIG. 9, after initialization, at a step S1A, wheel speeds of the right and left front wheels 10, 14, and right and left rear wheels 20, 22 are calculated in accordance with outputs of the wheel speed sensors 12, 16. 24, 26, respectively, and a pseudo vehicular body speed is calculated on a maximum one of tile wheel speeds calculated.

At a subsequent step S2A, the wheel acceleration/deceleration and the wheel skid ratio are calculated. Subsequently, at a step S3A, the pressure reduction threshold value for starting a reduction in brake fluid pressure within the wheel cylinder 50 is obtained by table lookup operation on the pseudo vehicular body speed.

As shown FIG. 10, the pressure reduction threshold value is given as a speed value which gives a predetermined skid ratio to the pseudo vehicular body speed. Referring to FIG. 10, it is preferable to establish the skid ratio to be gradually reduced as the vehicular speed is increased in such a manner that the pressure reduction threshold value is: 8.5 km/h in the vicinity of the vehicular speed of 10 km/h with the skid ratio of 85%; 11 km/h in the vicinity of the vehicular speed of 50 km/h with the skid ratio of 22%; 12 km/h in the vicinity of the vehicular speed of 70 km/h with the skid ratio of 17%; 16 km/h in the vicinity of the vehicular speed of 170 km/h with the skid ratio of 10% and; 17 km/h in the vicinity of the vehicular speed of 200 km/h with the skid ratio of 8.5%. However, as indicated by a fully-drawn line in FIG. 10, tuning of a real vehicle reveals that an excellent result can be obtained by reducing temporarily the skid ratio (which is, for example, 9% in the vicinity of the vehicular speed of 110 km/h and 140 km/h), and not holding a linear characteristic thereof in the range of the vehicular speed from 70 km/h to 170 km/h. It is to be noted that a two-dot chain line in FIG. 10 indicates a case with the constant skid ratio of 10%.

Thus, at the step S3A, when the pseudo vehicular body speed is 70 km/h, for example, the pressure reduction threshold value is 12 km/h, and a target wheel skid ratio is established at 17%.

At a subsequent step S4A, tile wheel skid ratio obtained at the step S1A is compared with the target wheel skid ratio obtained at the step S3A. If the wheel skid ratio is greater than the target wheel skid ratio, control proceeds to a step S6A wherein brake fluid pressure decreasing control is carried out. That is, the ECU 40 provides a change-over signal to the change-over control valve 62 of the actuator unit 60 so as to cut off communication of the master cylinder 52 with the wheel cylinder 50, and establish communication of the wheel cylinder 50 with the reservoir 64.

On the other hand, at the step S4A, if the wheel skid ratio is smaller than the target wheel skid ratio, control proceeds to a step S5A wherein it is judged whether or not the wheel acceleration/deceleration is greater than a predetermined retention level. If the wheel acceleration/deceleration is greater than the predetermined retention level, it means that fluid pressure within the wheel cylinder 50 is rather short, so that control proceeds to a step S7A wherein brake fluid pressure increasing control is carried out. In this case, the change-over control valve 62 of the actuator unit 60 is driven to establish communication of the master cylinder 52 with the wheel cylinder 50.

On the other hand, at the step S5A, if the wheel acceleration/deceleration is smaller than the predetermined retention level, control proceeds to a step S5A wherein brake fluid pressure retaining control is carried out. In this case, the change-over control valve 62 is driven to cut off communication of the wheel cylinder 50 with the master cylinder 52 and the reservoir 64.

Thus, after any of controls at the steps S6A, S7A, and S8A, control proceeds to a step S9A wherein time adjustment of 5 ms is carried out, and it returns to the step S1A. In other words, the above control routine is carried out every 5 ms.

Referring to FIG. 11, a further description will be made with regard to a situation of the above control in comparison with the prior art.

In FIG. 11, a broken line indicates a case of this embodiment wherein as compared with the prior art, the target wheel speed $V_{S2}$ and the target skid ratio $S_{r2}$ upon high speed as a pressure reduction threshold value for starting pressure decreasing control are established to be smaller than that ones upon low speed. It will be understood that in this embodiment, since pressure reduction starts at a point "b'", overshoot of the brake fluid pressure with regard to the lock fluid pressure $P_L$ fails to occur, and a recovery time of the wheel speed becomes shorter than the prior art, resulting in a smooth pressure control with a shortened cycle of decrease—retention—increase. Therefore, the vehicle is free from unstable behavior due to an increase in skid amount, and a long-sustained short braking force state due to excessive pressure reduction.

Having described the present invention in connection with the preferred embodiments, it is to be noted that the present invention is not limited thereto, and various changes and modifications are possible without departing from the spirit of the present invention. By way of example, the deceleration of the vehicle is obtained by calculation, alternatively, it can be obtained by a decelerationmeter.

What is claimed is:

1. A method of controlling a brake of a vehicle in a antilock manner, the vehicle having a plurality of wheels and a plurality of wheel cylinders arranged thereto, the method comprising the steps of:
   sensing speeds of each of the plurality of wheels, respectively;
   calculating a pseudo vehicular body speed in response to said speeds of the plurality of wheels;
   calculating a skid ratio of the plurality of wheels in response to said pseudo vehicular body speed and said speed of the plurality of wheels;
   determining a pressure reduction threshold value for starting a reduction of a brake fluid pressure within the plurality of wheel cylinders, said pressure reduction threshold value corresponding to said pseudo vehicular body speed at a predetermined ratio;
   calculating a target skid ratio of the plurality of wheels in accordance with said pressure reduction threshold value;
   comparing said skid ratio with said target skid ratio; and
   reducing said brake fluid pressure within the plurality of wheel cylinders when said skid ratio is greater than said target skid ratio.

2. A method as claimed in claim 1, further comprising the steps of:
   obtaining a deceleration of the vehicle;
   judging whether or not the vehicle cruises on snow in response to said deceleration of the vehicle; and
   correcting said pressure reduction threshold value in accordance with a result of said judging step.

3. A method as claimed in claim 1, wherein said predetermined ratio of said pressure reduction threshold value to said pseudo vehicular body speed upon low speed is smaller than that one upon high speed.

4. A method as claimed in claim 1, further comprising the steps of:
   calculating an acceleration and deceleration of the plurality of wheels;
   comparing said acceleration and deceleration of the plurality of wheels with a predetermined retention level;
   increasing said brake fluid pressure within the plurality of wheel cylinders when said acceleration and deceleration of the plurality of wheels is greater than said predetermined retention level; and
   retaining said brake fluid pressure within the plurality of wheel cylinders when said acceleration and deceleration of the plurality of wheels is smaller than said predetermined retention level.

5. A method as claimed in claim 1, wherein said predetermined ratio of said pressure reduction threshold value to said pseudo vehicular body is varied in accordance with predetermined sections of a range of said pseudo vehicular body speed.

6. A system for controlling a brake of a vehicle in a antilock manner, the vehicle having a plurality of wheels and a plurality of wheel cylinders arranged thereto, the system comprising:
   a plurality of speed sensors arranged to sense speeds of each of the plurality of wheels, respectively; and
   a microcomputer based control unit connected to said plurality of speed sensors, said microcomputer based control unit including:
   means for calculating a pseudo vehicular body speed in response to said speeds of the plurality of wheels;
   means for calculating a skid ratio of the plurality of wheels in response to said pseudo vehicular body speed and said speed of the plurality of wheels;
   means for determining a pressure reduction threshold value for starting a reduction of a brake fluid pressure within the plurality of wheel cylinders, said pressure reduction threshold value corresponding to said pseudo vehicular body speed at a predetermined ratio;
   means for calculating a target skid ratio of the plurality of wheels in accordance with said pressure reduction threshold value;
   means for comparing said skid ratio with said target skid ratio; and
   means for reducing said brake fluid pressure within the plurality of wheel cylinders when said skid ratio is greater than said target skid ratio.

7. A system as claimed in claim 6, wherein said microcomputer based control unit further including:
   means for obtaining a deceleration of the vehicle;
   means for judging whether or not the vehicle cruises on snow in response to said deceleration of the vehicle; and
   means for correcting said pressure reduction threshold value in accordance with a result of said judging means.

8. A system as claimed in claim 6, wherein said predetermined ratio of said pressure reduction threshold value to said pseudo vehicular body speed upon low speed is smaller than that one upon high speed.

9. A system as claimed in claim 6, wherein said microcomputer based control unit further including:
   means for calculating an acceleration and deceleration of the plurality of wheels;
   means for comparing said acceleration and deceleration of the plurality of wheels with a predetermined retention level;
   means for increasing said brake fluid pressure within the plurality of wheel cylinders when said acceleration and deceleration of the plurality of wheels is greater than said predetermined retention level; and
   means for retaining said brake fluid pressure within the plurality of wheel cylinders when said acceleration and deceleration of the plurality of wheels is smaller than said predetermined retention level.

10. A method as claimed in claim 6, wherein said predetermined ratio of said pressure reduction threshold value to said pseudo vehicular body is varied in accordance with predetermined sections of a range of said pseudo vehicular body speed.

* * * * *